US012658345B2

(12) United States Patent
Koeda et al.

(10) Patent No.: US 12,658,345 B2
(45) Date of Patent: Jun. 16, 2026

(54) SOFT MAGNETIC METAL POWDER, DUST CORE, MAGNETIC COMPONENT, AND ELECTRONIC COMPONENT

(71) Applicant: TDK CORPORATION, Tokyo (JP)

(72) Inventors: Masahito Koeda, Tokyo (JP); Satoko Mori, Tokyo (JP); Kazuhiro Yoshidome, Tokyo (JP); Hiroyuki Matsumoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 877 days.

(21) Appl. No.: 17/992,378

(22) Filed: Nov. 22, 2022

(65) Prior Publication Data

US 2023/0178275 A1 Jun. 8, 2023

(30) Foreign Application Priority Data

Nov. 29, 2021 (JP) ................................ 2021-193484

(51) Int. Cl.

*H01F 1/147* (2006.01)
*H01F 1/153* (2006.01)
*H01F 3/08* (2006.01)

(52) U.S. Cl.

CPC ....... *H01F 1/1475* (2013.01); *H01F 1/15308* (2013.01); *H01F 1/15383* (2013.01); *H01F 3/08* (2013.01)

(58) Field of Classification Search

CPC ............... H01F 1/1475; H01F 1/15308; H01F 1/15383; H01F 3/08; H01F 1/24; H01F 1/33; H01F 27/255

See application file for complete search history.

(56) References Cited

U.S. PATENT DOCUMENTS

2016/0307679 A1* 10/2016 Taheri ....................... B22F 3/02
2021/0098164 A1* 4/2021 Koeda ....................... H01F 1/24

FOREIGN PATENT DOCUMENTS

| | | | |
|---|---|---|---|
| CN | 112309667 | A | 2/2021 |
| JP | 2015-132010 | A | 7/2015 |
| JP | 2020-155674 | A | 9/2020 |

OTHER PUBLICATIONS

Yan et al. "Nanoscale zero-valent iron (nZVI): Aspects of the core-shell structure and reactions with inorganic species in water" Journal of Contaminant Hydrology 118 (2010) p. 96-104 (Year: 2010).*

Translation of Apr. 29, 2026 Office Action issued in Chinese Application No. 202211499092.3.

* cited by examiner

*Primary Examiner* — Andrew J. Oyer

(74) *Attorney, Agent, or Firm* — Oliff PLC

(57) ABSTRACT

A soft magnetic metal powder including a soft magnetic metal particle. The soft magnetic metal particle includes a metal particle and an oxide part covering the metal particle. An interface between the metal particle and the oxide part has roughness. A maximum height Rz of roughness at the interface between the metal particle and the oxide part is within a range of 1.0 nm or more and 50.0 nm or less.

8 Claims, 5 Drawing Sheets

SOFT MAGNETIC METAL POWDER, DUST CORE, MAGNETIC COMPONENT, AND ELECTRONIC COMPONENT

TECHNICAL FIELD

The present invention relates to a soft magnetic metal powder, a dust core, a magnetic component, and an electronic component.

BACKGROUND

Patent Document 1 discloses to from an insulation coating layer to a surface of a Fe-based amorphous alloy powder by softening a powder glass including oxides of phosphorous (P) using a mechanical friction.

[Patent Document 1] JP Patent Application Laid Open No. 2015-132010

SUMMARY

In recent years, there is a demand to attain both withstand voltage and high permeability at a higher standard.

The object of the present invention is to provide a soft magnetic metal powder suitable for a dust core with good withstand voltage and permeability, and also to provide a magnetic component including the dust core.

A soft magnetic metal powder according to the present invention includes a soft magnetic metal particle, wherein the soft magnetic metal particle includes a metal particle and an oxide part covering the metal particle, an interface between the metal particle and the oxide part has roughness, and a maximum height Rz of roughness at the interface between the metal particle and the oxide part is within a range of 1.0 nm or more and 50.0 nm or less.

An arithmetic mean roughness Ra at the interface may be within a range of 0.2 nm or more and 10.0 nm or less.

A thickness of the oxide part may be within a range of 1.0 nm or more and 100 nm or less on an average.

The soft magnetic metal particle may further include a coating part covering the oxide part.

A thickness of the coating part may be within a range of 1.0 nm or more and 100 nm or less on an average.

A dust core according to the present invention includes the above-described soft magnetic metal powder.

A magnetic component according to the present invention includes the above-described soft magnetic metal powder.

An electronic component according to the present invention includes the above-described soft magnetic metal powder.

BRIEF DESCRIPTION OF THE SEVERAL VIEWS OF THE DRAWING(S)

DETAILED DESCRIPTION

Figure 1:
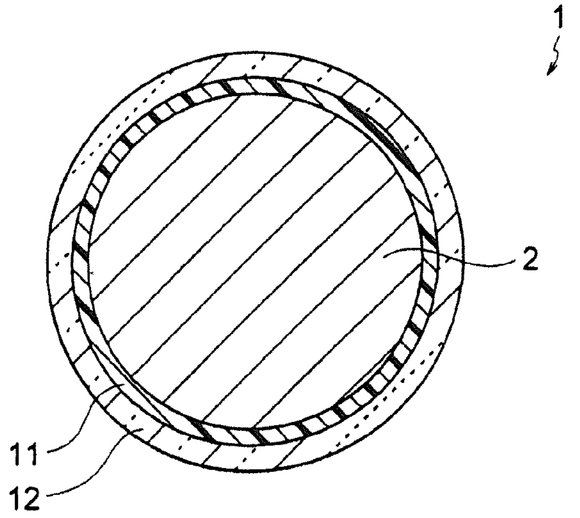
FIG. 1 is a schematic cross section of a soft magnetic metal particle.

Hereinbelow, the present invention is described in a following order based on specific embodiments shown in the figures.

1. Soft magnetic metal powder
1.1. Material of metal particle
1.2. Oxide part
1.3. Coating part
2. Dust core
3. Magnetic component
4. Electronic component
5. Method of producing dust core
5.1. Method of producing soft magnetic metal powder
5.2. Method of producing dust core (1. Soft Magnetic Metal Powder)

A soft magnetic metal powder includes soft magnetic metal particles 1. As shown in FIG. 1, a soft magnetic metal particle 1 includes a metal particle 2 and an oxide part 11 coating the metal particle 2. Also, as shown in FIG. 1, the soft magnetic metal particle 1 may include a coating part 12 which covers the oxide part 11.

A shape of the soft magnetic metal particle 1 included in the soft magnetic metal powder may preferably be a sphere shape. For example, an average circularity of cross sections of the soft magnetic metal particles 1 included in the soft magnetic metal powder may be 0.85 or more. Also, for obtaining a circularity of the cross section of the soft magnetic metal particle 1, a circularity calculated from $2\times(\pi\times\text{cross sectional area})^{1/2}/(\text{circumference length of cross section})$ is used.

Also, an average particle size (D50) of the soft magnetic metal particles 1 included in the soft magnetic metal powder may be determined based on the purpose of use and the material. The average particle size (D50) of the soft magnetic metal particles 1 may be within a range of 0.3 to 100 μm. By setting the average particle size of the soft magnetic metal particles 1 within the above-mentioned range, a sufficient molding property can be easily maintained. Also, a predetermined magnetic property can be easily maintained. A method of measuring an average particle size of the soft magnetic metal particles 1 is not particularly limited. For example, a laser diffraction scattering method may be used.

In case of calculating an average particle size (D50) from a magnetic component, a cross section of the magnetic component may be observed. In such case, a circle equivalent diameter of each soft magnetic metal particle included in the cross section of the magnetic component is calculated, and the circle equivalent diameter of each soft magnetic metal particle is considered as the particle size of each soft magnetic metal particle. Then, an average particle size (D50) is calculated by using the particle size of each soft magnetic metal particle.

A material of the soft magnetic metal particles 1 included in the soft magnetic metal powder may be all the same, or may be different from each other.

(1.1. Metal Particle)

The metal particle 2 may be made of soft magnetic metals including iron (Fe). As the soft magnetic metals including Fe, for example, a Fe-based crystal material, a Fe-based amorphous alloy, and a Fe-based nanocrystal alloy may be mentioned.

The Fe-based amorphous alloy may be constituted only from an amorphous phase, or may be constituted by a structure in which initial fine crystals are dispersed in the amorphous phase, that is it may also be a nanohetero structure.

The Fe-based nanocrystal alloy is a structure in which Fe-based nanocrystals of nano-meter size are dispersed in the amorphous phase.

As the soft magnet metals including iron, the Fe-based amorphous alloy, or the Fe-based nanocrystal alloy may be preferable. In below, the Fe-based amorphous alloy and the Fe-based nanocrystal alloy are described.

The Fe-based amorphous alloy may be constituted only from a amorphous phase, or it may have a nanohetero structure. A nanohetero structure is a structure which is obtained by quenching a molten of soft magnetic metal raw material. Further, the nanohetero structure is a structure in which numerous initial fine crystals have deposited and dispersed in the amorphous alloy. An average crystal size of the initial fine crystals may be within a range of 0.3 nm or more and 10 nm or less.

A composition of the Fe-based amorphous alloy is described in detail.

The composition of the Fe-based amorphous alloy is not particularly limited. The composition of the Fe-based amorphous alloy may be represented by a compositional formula of $(Fe_{(1-(\alpha+\beta))}X1_{\alpha}X2_{\beta})_{(1-(a+b+c+d+e+f))}(M_aB_bP_cSi_dC_eS_f$.

In the above compositional formula, M may be at least one element selected from the group consisting of niobium (Nb), hafnium (Hf), zirconium (Zr), tantalum (Ta), molybdenum (Mo), tungsten (W), titanium (Ti), and vanadium (V).

An atomic ratio (a) of M may be within a range of $0 \le a \le 0.300$ from the point of obtaining preferable withstand voltage and strength of the dust core. That is, the Fe-based amorphous alloy may not include M.

From the point of obtaining preferable soft magnetic properties of the soft magnetic metal powder and the dust core, the atomic ratio (a) of M may be within a range of $0 \le a \le 0.150$. Further, (a) may be 0.040 or larger, or 0.050 or larger. Further, (a) may be 0.100 or less, or 0.080 or less. When (a) is small, a preferable saturation magnetization of the soft magnetic metal powder tends to be obtained easily.

An atomic ratio (b) of boron (B) may be within a range of $0 \le b \le 0.400$ from the point of obtaining preferable withstand voltage and strength of the dust core. That is, the Fe-based amorphous alloy may not include B.

From the point of obtaining preferable soft magnetic properties of the soft magnetic metal powder and the dust core, the atomic ratio (b) of B may be within a range of $0 \le b \le 0.200$. Further, (b) may be 0.025 or larger, 0.060 or larger, or 0.080 or larger. Also, (b) may be 0.150 or less, or 0.120 or less. When (b) is small, a preferable saturation magnetization of the soft magnetic metal powder tends to be obtained easily.

An atomic ratio (c) of phosphorous (P) may be within a range of $0 \le c \le 0.400$ from the point of obtaining preferable withstand voltage and strength of the dust core. That is, the Fe-based amorphous alloy may not include P.

From the point of obtaining preferable soft magnetic properties of the soft magnetic metal powder and the dust core, the atomic ratio (c) of P may be within a range of $0 \le c \le 0.200$. Further, (c) may be 0.005 or larger, or 0.010 or larger. Also, (c) may be 0.100 or less. When (c) is within the above-mentioned range, a specific resistance of the soft magnetic metal powder tends to improve easily, and a coercivity tends to decrease easily. When (c) is small, a preferable saturation magnetization of the soft magnetic metal powder tends to be obtained easily.

An atomic ratio (d) of silicon (Si) may be within a range of $0 \le d \le 0.400$ from the point of obtaining preferable withstand voltage and strength of the dust core. That is, the Fe-based amorphous alloy may not include Si.

From the point of obtaining preferable soft magnetic properties of the soft magnetic metal powder and the dust core, the atomic ratio (d) of Si may be within a range of $0 \le d \le 0.200$. Further, (d) may be 0.001 or larger, or 0.005 or larger. Also, (d) may be 0.040 or less. When (d) is within the above-mentioned range, the coercivity of the soft magnetic metal powder tends to decrease easily.

An atomic ratio (e) of carbon (C) may be within a range of $0 \le e \le 0.400$ from the point of obtaining preferable withstand voltage and strength of the dust core. That is, the Fe-based amorphous alloy may not include C.

From the point of obtaining preferable soft magnetic properties of the soft magnetic metal powder and the dust core, the atomic ratio (e) of C may be within a range of $0 \le e \le 0.200$. Further, (e) may be 0.001 or larger. Also, (e) may be 0.035 or less, or 0.030 or less. When (e) is within the above-mentioned range, the coercivity of the soft magnetic metal powder tends to decrease easily.

An atomic ratio (f) of sulfur (S) may be within a range of $0 \le f \le 0.040$ from the point of obtaining preferable withstand voltage and strength of the dust core. That is, the Fe-based amorphous alloy may not include S.

From the point of obtaining preferable soft magnetic properties of the soft magnetic metal powder and the dust core, the atomic ratio (f) of S may be within a range of $0 \le f \le 0.020$. Further, (f) may be 0.001 or larger, or 0.002 or larger. Also, (f) may be 0.010 or less. When (f) is within the above-mentioned range, the coercivity of the soft magnetic metal powder tends to decrease easily.

Also, when (f) is 0.001 or larger, a circularity of the cross section of the soft magnetic metal particle 1 included in the soft magnetic metal powder tends to improve easily compared to the case of $f=0$. Further, the density of the dust core tends to improve easily.

An atomic ratio $(1-(a+b+c+d+e+f))$ of iron (Fe) may be within a range of 0.410 or larger and 0.910 or less from the point of obtaining preferable withstand voltage and strength of the dust core.

From the point of obtaining preferable soft magnetic properties of the soft magnetic metal powder and the dust core, the atomic ratio $(1-(a+b+c+d+e+f))$ may be within a range of 0.700 or larger and 0.850 or less. When the atomic ratio $(1-(a+b+c+d+e+f))$ is within the above-mentioned range, it becomes difficult to form a crystal phase made of crystal having a crystal particle size larger than 100 nm.

Also, as shown in the above compositional formula, X1 and/or X2 may partially replace iron.

X1 is at least one element selected from the group consisting of cobalt (Co) and nickel (Ni). In the above compositional formula, a represents an atomic ratio of X1 to a total of X1 and X2. Also, a is 0 or larger. That is, the Fe-based amorphous alloy may not include X1.

From the point of obtaining preferable withstand voltage and strength of the dust core, the atomic ratio of X1 may be 70.00 at % or less which is a ratio to the entire composition, that is to a total of Fe, X1, X2, M, B, P, Si, C, and S. That is, $0 \le \alpha\{1-(a+b+c+d+e+f)\} \le 0.7000$ may be satisfied.

From the point of obtaining preferable withstand voltage and strength of the dust core, the atomic ratio of X1 to a total of Fe, X1, X2, M, B, P, Si, C, and S may be 40.00 at % or less. That is, $0 \le \alpha\{1-(a+b+c+d+e+f)\} \le 0.4000$ may be satisfied.

Also, X2 is at least one element selected from the group consisting of aluminum (Al), manganese (Mn), silver (Ag), zinc (Zn), tin (Sn), arsenic (As), antimony (Sb), copper (Cu), chromium (Cr), bismuth (Bi), nitrogen (N), oxygen (O), and rare earth elements. In the above-mentioned compositional formula, β represents an atomic ratio of X2 to a total of Fe, X1, and X2. Also, β may be 0 or larger. That is, the Fe-based amorphous alloy may not include X2.

From the point of obtaining preferable withstand voltage and strength of the dust core, the atomic ratio of X2 to a total of Fe, X1, X2, M, B, P, Si, C, and S may be 6.00 at % or less. That is, $0 \leq \beta\{1-(a+b+c+d+e+f)\} \leq 0.0600$ may be satisfied.

From the point of obtaining preferable soft magnetic properties of the soft magnetic metal powder and the dust core, the atomic ratio of X2 to a total of Fe, X1, X2, M, B, P, Si, C, and S may be 3.00 at % or less. That is, $0 \leq \beta\{1-(a+b+c+d+e+f)\} \leq 0.0300$ may be satisfied.

Further, from the point of obtaining preferable withstand voltage and strength of the dust core, a range (substitution ratio) of X1 and/or X2 which can replace iron may be 0.94 or less in terms of a number of atoms to a total number of Fe atoms. That is, $0 \leq \alpha + \oplus \leq 0.94$ may be satisfied.

From the point of obtaining preferable soft magnetic properties of the soft magnetic metal powder and the dust core, a range (substitution ratio) of X1 and/or X2 which can replace iron may be half or less in terms of a number of atoms to a total number of Fe atoms. That is, $0 \leq \alpha + \beta \leq 0.50$ may be satisfied. In case of $\alpha + \beta > 0.50$, it becomes difficult to obtain a soft magnetic metal in which the Fe-based nanocrystal is deposited by a heat treatment.

Note that, the above-mentioned Fe-based amorphous alloy may include inevitable impurity elements which are other elements other than Fe, X1, X2, M, B, P, Si, C, and S mentioned in above. For example, to 100 mass % of the Fe-based amorphous alloy, a total of 0.1 mass % or less of elements other than Fe, X1, X2, M, B, P, Si, C, and S may be included.

When the Fe-based amorphous alloy having nanohetero structure is heat treated under a predetermined condition, initial fine crystals can grow and the Fe-based nanocrystal alloy can be obtained.

The Fe-based nanocrystal alloy includes a Fe-based nanocrystal. The Fe-based nanocrystal is a crystal of Fe having a crystal particle size of nano meter size, and has a bcc (body-centered cubic) crystal structure. In the Fe-based nanocrystal alloy, many Fe-based nanocrystals are deposited and dispersed in the amorphous phase. The Fe-based nanocrystal can be obtained by heat treating the Fe-based amorphous alloy of nanohetero structure to grow the initial fine crystals.

Therefore, an average crystal particle size of the Fe-based nanocrystals tends to be slightly larger than an average crystal particle size of the initial fine crystals. In the present embodiment, the average crystal particle size of the Fe-based nanocrystals may be within a range of 5 nm or more and 30 nm or less. The soft magnetic metal powder including the soft magnetic metal of which the Fe-based nanocrystals are dispersed in the amorphous phase tends to easily attain a high saturation magnetization and a low coercivity.

In the present embodiment, the composition of the Fe-based nanocrystal alloy may be the same as the above-mentioned Fe-based amorphous alloy. Therefore, the above description regarding the Fe-based amorphous alloy also applies to the composition of the Fe-based nanocrystal alloy.

(1.2. Oxide Part)

The oxide part 11 is formed so that it covers the surface of the metal particle 2 as shown in FIG. 1. Also, "a substance covers the surface" is the same as "a substance contacts the surface and is fixed in a way that the contacting area is covered". Also, the oxide part 11 covering the metal part 2 may at least partially cover the surface of the metal particle 2. The oxide part 11 may cover about 90% or more of the surface of the metal particle 2. The surface of the metal particle 2 may be entirely covered by the oxide part 11. The oxide part 11 may cover the surface of the metal particle 2 in a continuous manner, or it may cover in a discontinuous manner.

The composition of the oxide part 11 is not particularly limited, and may at least include oxides of the elements included in the metal particle 2. For example, when the metal particle 2 includes Fe, the oxide part 11 may include oxides of Fe. As discussed in below, the oxide part 11 may be formed by oxidizing the surface of the metal particle 2.

Figure 2:
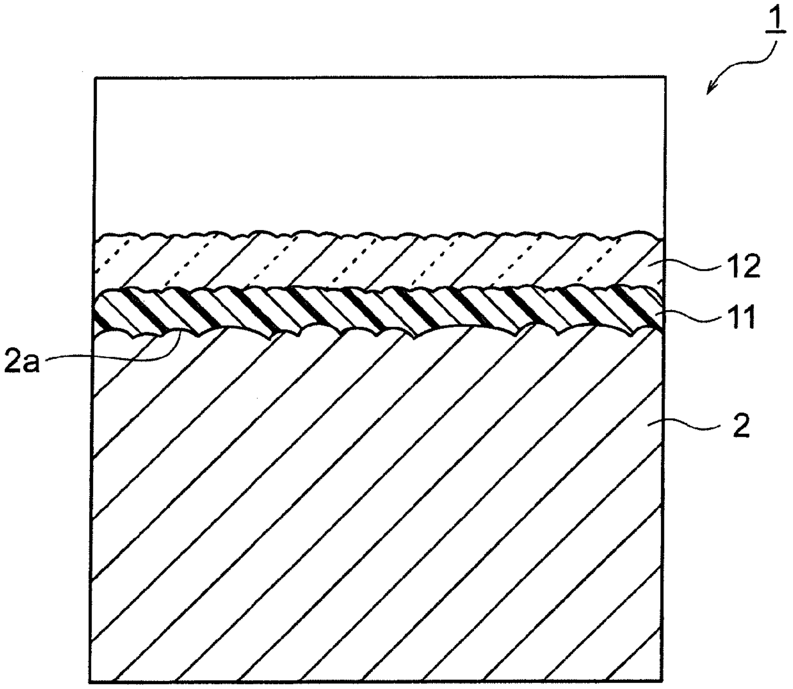
FIG. 2 is a schematic cross section of a soft magnetic metal particle.

As shown in FIG. 2, regarding the soft magnetic metal particle 1, the interface **2*a* between the metal particle 2 and the oxide part 11** has roughness.

Further, the above-mentioned roughness increases a surface roughness of the interface **2*a* between the metal particle 2 and the oxide part 11. Specifically, a maximum height Rz, a type of surface roughness at the interface 2*a* between the metal particle 2 and the oxide part 11, is within a range of 1.0 nm or higher and 50.0 nm or lower. The maximum height Rz may be within a range of 4.3 nm or higher and 49.3 nm or lower. An arithmetic mean roughness Ra, a type of surface roughness of the interface 2*a* between the metal particle 2 and the oxide part 11** may be within a range of 0.2 nm or higher and 10.0 nm or lower, or 0.2 nm or higher and 9.9 nm or lower.

When the maximum height Rz is within the above-mentioned range, the withstand voltage of the dust core produced using the soft magnetic metal powder including the soft magnetic metal particles 1 improves. The withstand voltage of the dust core does not sufficiently improve when the maximum height Rz is too small or too large. Further, a permeability of the dust core may decrease in some cases.

Also, when the arithmetic mean roughness Ra is within a predetermined range, the withstand voltage and the permeability can be further improved in good balance.

Hereinafter, when simply referring to "surface roughness", this refers to both the maximum height Rz and the arithmetic mean roughness Ra. A method of measuring surface roughness is not particularly limited. In below, a method of measuring surface roughness by observing the cross section of the soft magnetic metal particle 1 is described.

For a cross section observation of the soft magnetic metal particle 1, the cross section of the soft magnetic metal particle 1 is observed using a known electron microscope (Scanning Electron Microscope (SEM), Transmission Electron Microscope (TEM), and so on). For example, the metal particle 2 and the oxide part 11 are identified based on contrast differences in the observation image and compositional analysis results using EDS. A curved line which is the interface **2*a* between the metal particle 2 and the oxide part 11 is defined as an outline curve. A surface roughness of the interface 2*a*** is calculated from the obtained outline curve.

Figure 3:
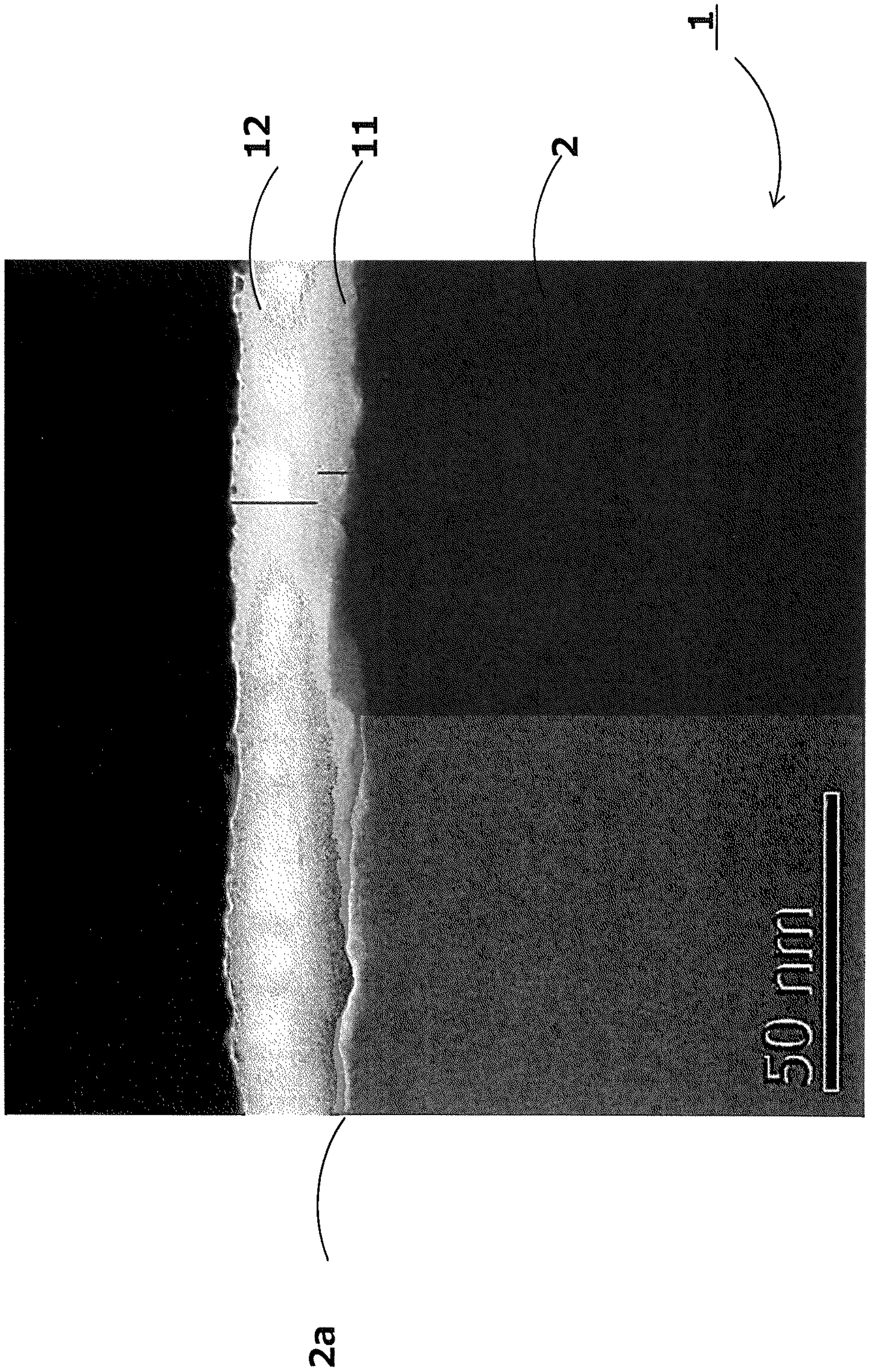
FIG. 3 is a cross section image of a soft magnetic metal particle.
Figure 4:
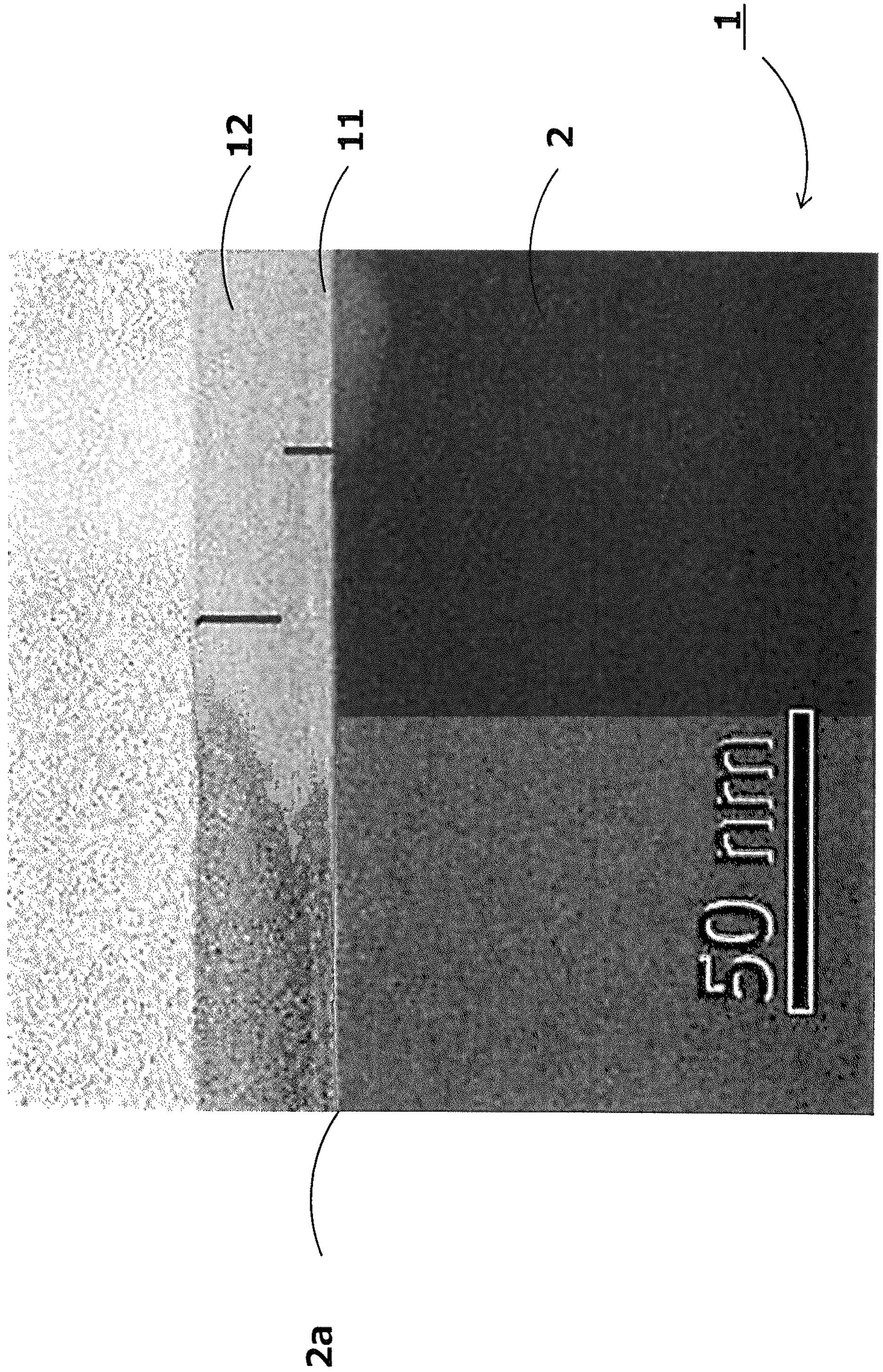
FIG. 4 is a cross section image of a soft magnetic metal particle.

For example, FIG. 3 shows a cross-section image of an example described in below. FIG. 4 shows a cross-section image of a comparative example in which the surface roughness of the interface is too small which is described later on. According to the cross-section image shown in FIG. 3, the interface **2*a* of the soft magnetic metal particle 1 which is between the metal particle 2 and the oxide part 11 has unevenness. Therefore, the soft magnetic metal particle 1 shown in FIG. 3 attains a sufficiently large surface roughness of the interface 2*a*. On the contrary to this, according to the cross-section image shown in FIG. 4, the soft magnetic metal particle 1 does not have unevenness at the interface 2*a* between the metal particle 1 and the oxide part 11. Hence, the surface roughness of the interface 2***a* of the soft magnetic metal particle 1 shown in FIG. 4 is too small.

Specifically, the surface roughness of the interface 2*a* between the metal particle 2 and the oxide part 11 can be calculated from the same a known method of calculating a surface roughness. First, a factor derived from the shape and a factor derived from undulation are removed from the obtained outline curve, and thereby a roughness curve is obtained. Based on the obtained roughness curve, Rz and Ra are calculated according to a method set forth in JIS B 601. That is, Rz and Ra can be measured using the same method as the method set forth in JIS B 601. However, Rz and Ra may be measured under different conditions from those described in JIS B 601.

A procedure to obtain the roughness curve from the outline curve can be carried out using known filter processing, flatness processing and so on.

Further, when the soft magnetic metal powder includes the soft magnetic metal particle 1, preferably the surface roughness of the interface 2*a* of the soft magnetic metal particle 1 having a high circularity, that is having a circularity of 0.95 or higher, may be measured in order to obtain highly accurate Rz and Ra. Also, the surface roughness of the interface 2*a* may preferably be measured using arbitrary points from arbitrary 10 to 100 soft magnetic metal particles 1 having high circularity.

A standard length of the outline curve may be within a range of 0.1 μm to 50 μm. The measurement of the outline curve may be performed to 10 to 100 points or so of one soft magnetic metal particle 1. The average value of Rz calculated from the measurement results may be considered as Rz of the soft magnetic metal powder. The average value of Ra calculated from the measurement results may be considered as Ra of the soft magnetic metal powder.

From the roughness curve, a standard length along a direction of average line of the roughness curve is taken out, then within this part which has been taken out, the sum of highest point and lowest point is the maximum height Rz.

From the roughness curve, a standard length along a direction of average line of the roughness curve is taken out, and when the roughness curve is represented by the below mathematical formula 1 in which X axis is the direction of average line of the part taken out and Y axis is an axial magnification direction, the arithmetic mean roughness Ra is defined by the below mathematical formula 2. That is, the arithmetic mean roughness is an average of the distance from an average line of the roughness curve to the average curve. Note that, L is the standard length.

$$y = f(x) \quad \text{[Mathematical formula 1]}$$

$$Ra = \frac{1}{L}\int_0^L |f(x)|dx \quad \text{[Mathematical formula 2]}$$

(1.3. Coating Part)

As shown in FIG. 1, the coating part 12 is formed so as to cover the surface of the oxide part 11. At an area where the oxide part 11 is not formed, the coating part 12 is formed so as to cover the surface of the metal particle 2. Hereinbelow, "the surface of the of the oxide part 11 or the metal particle 2" means "the surface of the oxide part 11 when the oxide part 11 is formed, and the surface of the metal particle 2 when the oxide part 11 is not formed". Also, in the present embodiment, "a substance covers the surface" is the same as "a substance contacts the surface and is fixed in a way that the contacting area is covered". Also, the coating part 12 covering the oxide part 11 or the metal particle 2 may at least partially cover the surface of the oxide part 11. The coating part 12 may cover 90% or more of "the surface of the oxide part 11 and the metal particle 2". The coating part 12 may entirely cover "the surface of the oxide part 11 and the metal particle 2". The coating part 12 may cover "the surface of the metal particle 2 or the oxide part 11" in a continuous manner, or it may cover in a discontinuous manner.

A material of the coating part 12 is not particularly limited. The material of the coating part 12 may be a material capable of insulating the soft magnetic metal particles against each other which constitute the soft magnetic metal powder. That is, the material of the coating part 12 has an insulating property. For example, the coating part 12 may include at least one selected from the group consisting of phosphorus (P), aluminum (Al), calcium (Ca), barium (Ba), bismuth (Bi), silicon (Si), chromium (Cr), sodium (Na), zinc (Zn), and oxygen (O). Preferably, the coating part 12 may include a compound which include at least one selected from the group consisting of phosphorous, zinc, and sodium. Said compound may more preferably be an oxide, and even more preferably an oxide glass.

When said compound is an oxide, the coating part 12 may preferably include an oxide of at least one element selected from the group consisting of P, Al, Ca, Ba, Bi, Si, Cr, Na, and Zn as a main component. Here, "the coating part 12 may preferably include an oxide of at least one element selected from the group consisting of P, Al, Ca, Ba, Bi, Si, Cr, Na, and Zn as a main component" means that when a total amount of elements excluding oxygen is 100 mass %, a total amount of at least one element selected from the group consisting of P, Al, Ca, Ba, Bi, Si, Cr, Na, and Zn is the largest. Also, in the coating part 12, preferably, the total amount of at least one element selected from the group consisting of P, Al, Ca, Ba, Bi, Si, Cr, Na, and Zn may be 50 mass % or more, and more preferably 60 mass % or more.

When said compound is an oxide glass, a type of the oxide glass is not particularly limited. For example, phosphate ($P_2O_5$)-based glass, bismuthate ($Bi_2O_3$)-based glass, and borosilicate ($B_2O_3$—$SiO_2$)-based glass may be mentioned.

As $P_2O_5$-based glass, a glass including 50 mass % or more of $P_2O_5$ may be preferable. As $P_2O_5$-based glass, $P_2O_5$—ZnO—$R_2O$—$Al_2O_3$-based glass and the like may be mentioned. Note that, R which is included as $R_2O$ in $P_2O_5$-based glass is an alkaline metal.

As $Bi_2O_3$-based glass, a glass including 50 mass % or more of $Bi_2O_3$ may be preferable. As $Bi_2O_3$-based glass, $Bi_2O_3$—ZnO—$B_2O_3$—$SiO_2$-based glass and the like may be mentioned.

As $B_2O_3$—$SiO_2$-based glass, a glass including 10 mass % or more of $B_2O_3$ and 10 mass % or more of $SiO_2$ may be preferable. For example, as $B_2O_3$—$SiO_2$-based glass, BaO—ZnO—$B_2O_3$—$SiO_2$—$Al_2O_3$-based glass and the like may be mentioned.

Regarding the soft magnetic metal powder, when the metal particle 2 having the oxide part 11 in which Ra and Rz are within the predetermined ranges further includes the coating part 12, the withstand voltage of the dust core constituted by the soft magnetic metal powder further improves.

Components included in the coating part 12 can be identified; by an element analysis using Energy Dispersive X-ray Spectroscopy (EDS) using a Transmission Electron Microscope (TEM) such as a Scanning Transmission Electron Microscope (STEM); by an element analysis using Electron Energy Loss Spectroscopy (EELS); by a lattice constant obtained using Fast Fourier Transformation (FFT) of a TEM image, and the like.

A method of measuring a thickness of oxide part 11 and coating part 12 is not particularly limited. For example, a known electron microscope (Scanning Electron Microscope (SEM), Transmission Electron Microscope (TEM), and so on) may be used to observe the cross section of the soft magnetic metal particle 1, and based on the contrast differences in the observation image and the compositional analysis result using EDS, the oxide part 11 and the coating part 12 can be identified, and thereby the thicknesses thereof can be measured. Preferably, the measurements of thicknesses of the oxide part 11 and the coating part 12 may be performed to 5 to 10 positions from one soft magnetic metal particle 1. Also, the measurements for the average thickness of oxide parts 11 and the average thickness of the coating parts 12 may be performed to 10 to 100 soft magnetic metal particles 1. From the obtained measurement results, the average thickness of the oxide parts 11 and the average thickness of the coating parts 12 can be calculated.

The average thickness of the oxide parts 11 is not particularly limited. For example, it may be within a range of 1.0 nm or more and 100 nm or less. From the point of obtaining a high permeability, it may be 20 nm or less. From the point of obtaining both a high permeability and a high withstand voltage, it may preferably be within a range of 5.0 nm or more and 20 nm or less, or more preferably within a range of 5.0 nm or more and 15 nm or less.

The average thickness of the coating parts 12 is not particularly limited. For example, it may be within a range of 1.0 nm or more and 100 nm or less, may be within a range of 1.0 nm or more and 50 nm or less, or may be within a range of 10 nm or more and 50 nm or less.

Also, when a number ratio of the soft magnetic metal particles included in the soft magnetic metal powder is 100%, a number ratio of the soft magnetic metal particles 1 having the metal particle 2, the oxide part 11 covering the metal particle 2, and the coating part 12 covering the oxide part 11 may be 90% or more, or 95% or more.

(2. Dust Core)

The dust core includes the above-mentioned soft magnetic powder, and it is formed into a predetermined shape. The dust core may include a resin as a binder and the soft magnetic powder. Further, the soft magnetic metal particles constituting the soft magnetic powder are bonded using the resin, thereby the dust core is fixed in a predetermined shape.

Note that, the dust core may be constituted by a mixed powder which includes the above-mentioned soft magnetic metal powder and other magnetic powders, and the dust core may be formed into a predetermined shape.

In general, regarding the dust core, the magnetic properties can be enhanced by increasing the ratio (filling factor) of the magnetic component. In order to increase the ratio (filling factor) of the magnetic component, a method of reducing the amount of the resin having an insulating property is known. However, in case of reducing the amount of resin in the dust core, a ratio of the soft magnetic metal particles contacting with each other increases. As a result, when AC voltage is applied to a magnetic component including the dust core, a loss increases due to current (interparticle eddy current) flowing between the soft magnetic metal particles which are contacting with each other. As a result, a core loss of the dust core increases.

The coating part is formed to the surface of the soft magnetic metal particle to suppress an eddy current. The present inventors have found that by making the dust core including the above-mentioned soft magnetic metal powder, the dust core having high withstand voltage and permeability, and a small core loss can be made.

(3. Magnetic Component)

The magnetic component may include the dust core including the above-mentioned soft magnetic metal powder. For example, it may be a magnetic component in which an air coil formed by winding a wire is installed inside the dust core of a predetermined shape. Also, it may be a magnetic component of which a wire is wound for a predetermined number of turns over the surface of the dust core of a predetermined shape.

(4. Electronic Component)

The electronic component may be an electronic component having the magnetic component including the dust core including the above-mentioned soft magnetic metal powder. For example, a power inductor used for a power circuit may be mentioned. In case the electronic component includes the magnetic component including the dust core including the above-mentioned soft magnetic metal powder, the withstand voltage is enhanced.

Also, as the magnetic component used for a power circuit of various electronic components, a transformer, a choke coil, and so on are known.

(5. Method of Producing Dust Core)

A method of producing the dust core including the above-mentioned soft magnetic metal powder is described. First, a method of producing the above-mentioned soft magnetic metal powder is described.

(5.1. Method of Producing Soft Magnetic Metal Powder)

In order to obtain the soft magnetic metal powder, first, the powder including metal particle 2 is produced. As a method of producing the powder including metal particle 2, the same method as a known production method can be used. Specifically, the powder including metal particle 2 can be produced using a gas atomization method, a water atomization method, a rotating disk method, and the like may be mentioned. Also, a ribbon obtained using a single roll method may be mechanically pulverized for production of the powder including metal particle 2. Among these production methods, a gas atomization method may be preferably used since the soft magnetic metal powder having desired shape and magnetic properties tends to be obtained easily.

In a gas atomization method, first, a molten is obtained by melting raw materials of the powder including metal particle 2. The raw materials of the metal elements (pure metal element and the like) included in the powder including metal particle 2 is prepared and weighed so that a composition of the powder including metal particle 2 at the end can be obtained, and the raw materials are melted. Note that, a method of melting the raw materials of the metal elements is not particularly limited. For example, a method of dissolving in a chamber of an atomization device after it is vacuumed may be mentioned. A temperature while melting may be determined depending on the melting point of each metal element. It may be within a range of 1200° C. to 1600° C.

The obtained molten is supplied to the chamber as continuous line of fluid through a nozzle provided at a bottom of a crucible. Then, high pressure gas is blown to the supplied molten to form droplets of molten and then quenched, thereby a fine powder was obtained. A gas blowing temperature, a pressure inside the chamber, and the like may be determined depending of the composition, structure, and the like of the powder including metal particle 2.

The gas spraying temperature may be within a range of 10° C. to 200° C.

An average particle size (D50) of the obtained metal powders may be within a range of 1 to 50 μm. Also, an average circularity of the cross section of metal particles included in the obtained powder may be within a range of 0.60 or more and 1.00 or less. Preferably, it may be within a range of 0.85 or more and 1.00 or less, or more preferably within a range of 0.93 or more and 1.00 or less. Note that, the average particle size of the metal particles 2 may be adjusted using a sieve classification, an air stream classification, and the like.

By producing the powder including the metal particles 2 under the above-mentioned condition, it tends to become easier to regulate Rz and Ra within predetermined range using a mechanochemical treatment under oxygen atmosphere as described in below.

The metal particle 2 included in the powder at this point is made of crystalline or amorphous alloy.

When the metal particle 2 includes crystals having an average crystal particle size larger than 30 nm, the metal particle 2 is considered that it is made of crystalline, and when crystals having an average crystal particle size larger than 30 nm does not exist in the metal particle 2, then it is considered that the metal particle 2 is made of amorphous. Note that, a known method may be used to evaluate whether the crystals having an average crystal particle size larger than 30 nm exists in the metal particle 2. For example, an X-ray diffraction analysis, observation using TEM, and the like may be mentioned. In case of using TEM, a selected area electron diffraction image, and a nanobeam diffraction image can be obtained for verification. In case of using a selected area electron diffraction image and a nanobeam diffraction image, when the metal particle 2 is made of amorphous alloy, the diffraction pattern shows a ring form diffraction. On the other hand, when the metal particle 2 is made of crystalline, then the diffraction pattern shows diffraction spots derived from the crystal structure.

Also, a method of evaluation of verifying the presence of the initial fine crystal in the metal particle 2 made of amorphous alloy and a method of evaluation of an average crystal particle size are not particularly limited. These may be evaluated using a known method. For example, TEM may be used to a thinly sliced sample using ion milling to obtain a bright field image or a high-resolution image, and the presence of the initial fine crystals and the average crystal particle size in the metal particle 2 can be verified. Specifically, by visually observing the bright field image or the high-resolution image obtained under the magnification of $1.0\times10^5$ to $3.00\times10^5$, the presence of the initial fine crystal and the average crystal particle size can be evaluated.

In case of obtaining the powder including the metal particles 2 made of nanocrystal alloy, to deposit the Fe-based nanocrystal, the powder including the metal particles 2 made of amorphous alloy may be preferably heat treated.

By carrying out the heat treatment to the powder including the metal particles 2 made of amorphous alloy, this prevents the metal particles 2 from sintering with each other and forming a coarse powder, and also facilitates the diffusion of elements included in the metal particles 2. As a result, the Fe-based nanocrystal can be deposited in the metal particle 2.

The heat treating condition is not particularly limited as long as the Fe-based nanocrystal can be easily deposited. For example, a heat treating temperature may be within a range of 400 to 700° C. and a holding time may be within a range of 0.5 to 10 hours. Also, the atmosphere during the heat treatment may be inert atmosphere such as Ar atmosphere.

By carrying out the heat treatment, the powder including the metal particle 2 made of nanocrystal alloy can be obtained.

Next, a pre-treatment is carried out to the obtained powder including the metal particle 2 to form the oxide part 11 on the metal particle 2. A method of pre-treatment for forming the oxide part 11 is not particularly limited. For example, a method which carries out a mechanochemical treatment under oxygen atmosphere may be mentioned.

Conventionally, as a method of forming the oxide part 11 on the surface of the meta particle 2, a method of carrying out a heat treatment under oxygen atmosphere may be mentioned. However, the surface roughness of the interface **2*a* between the metal particle 2 and the oxide part 11 barely changes compared to the surface roughness of the metal particle 2** prior to the heat treatment. Further, Rz does not become 1.0 nm or more.

The present inventors have found to carry out the pre-treatment for forming the oxide part 11 using a mechanochemical treatment under oxygen atmosphere. Specifically, a mechanochemical treatment is carried out under oxygen atmosphere using a powder coating device 100 shown in FIG. 5. The powder coating device 100 is a device which has been conventionally used for coating treatment of various powders. The present inventors have found that by using the powder coating device 100 for oxidation of the metal particle 2 included in the powder, oxidation can be suitably proceeded while increasing the surface roughness of the interface **2*a* between the metal particle 2 and the oxide part 11**.

Specifically, first, the powder including the metal particle 2 is introduced into the powder coating device 100 under oxygen atmosphere. Next, a rotor 101 inside the powder coating device 100 is rotated. The powder including the metal particle 2 is compressed under oxygen atmosphere between the inner wall of the rotor 101 and a press head 102. Due to the heat generated by friction, the temperature of the surface of the metal particle 2 under the oxygen atmosphere becomes high, and the surface roughness of the metal particle 2 increases due to the friction. At the same time, the surface of the metal particle 2 is oxidized.

For the mechanochemical treatment under oxygen atmosphere, first, the oxygen concentration inside the powder coating device 100 is adjusted. From the point of regulating Rz within a range of 1.0 nm or more and 50 nm or less, the oxygen concentration may be preferably adjusted within a range of 1% or higher and 5% or lower. When the oxygen concentration is too low, Rz becomes too small. When the oxygen concentration is too high, Rz becomes too large.

The distance between the press head 102 and the inner wall of the rotor 101 inside the powder coating device 100 is defined as a gap. The larger the gap is, the smaller the friction is between the wall face and the surface of the metal particle 2. As a result, when the dust core is produced by compressing the soft magnetic metal particles 1 obtained at the end, the withstand voltage of the obtained dust core tends to deteriorate. The size of the gap may be different depending on the structure of the powder coating device 100, the particle size of the metal particle, and the like; and for example, it may be within a range of 1 mm or more and 10 mm or less.

The treating time for the mechanochemical treatment under oxygen atmosphere is not particularly limited. The longer the treating time is, the thicker the oxide part 11 becomes. The thicker the oxide part 11 is, the withstand voltage of the dust core obtained at the end tends to increase, and the permeability tends to decrease. For example, the mechanochemical treatment time may be within a range of 15 minutes or longer and 180 minutes or shorter. Also, the oxygen concentration of oxygen atmosphere, the gap size, the treatment time, and the like may be adjusted accordingly so that Rz and Ra are in the preferable ranges.

Then, the coating part 12 is formed to the metal particle 2 to which the oxide part 11 is formed. A method of forming the coating part 12 is not particularly limited, and any known methods can be used. For example, a wet treatment may be carried out to the metal particle 2 to form the coating part 12, or a dry treatment may be carried out to form the coating part 12. Also, a coating method using mechanochemical treatment, a phosphate treatment method, a sol-gel method, and the like may be used to form the coating part 12.

Figure 5:
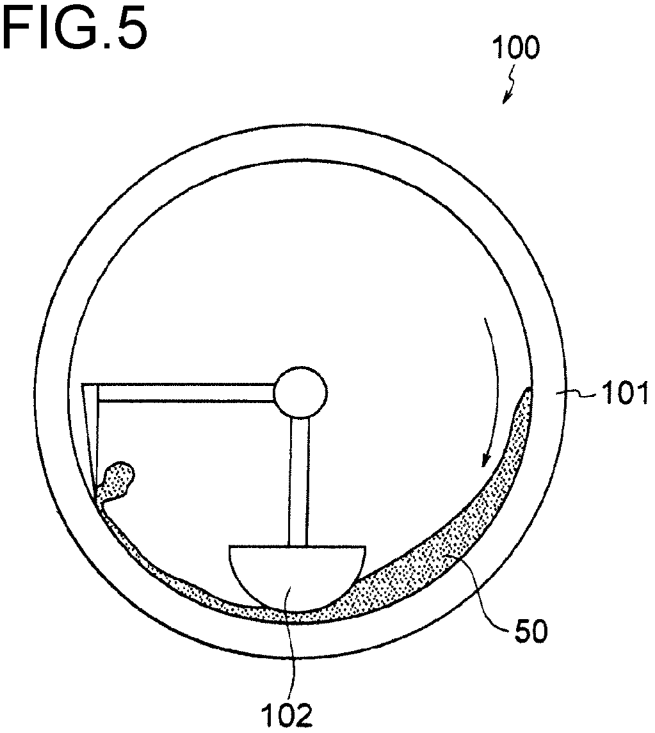
FIG. 5 is a schematic cross section of a powder coating device.

For the coating method using mechanochemical treatment, for example, the powder coating device 100 shown in FIG. 5 is used. In case of forming the oxide part 11 to the metal particle 2 by a mechanochemical treatment under oxygen atmosphere, a powder form coating material which is the material (compounds of P, Al, Ca, Ba, Bi, Si, Cr, Na, Zn, and the like) constituting the coating part is added to the metal particle 2 to which the oxide part 11 has been formed, and it is placed in the powder coating device 100; thereby a mixed product 50 is produced. Then, by rotating the rotor 101, the mixed product 50 is compressed between the press head 102 and the inner wall of the rotor 101, then friction generates heat. Due to this frictional heat, the powder form coating material is softened, and adheres on the surface of the oxide part 11. The adhered coating material is cooled and the coating part 12 is formed.

For the coating method using mechanochemical treatment, the frictional heat can be regulated by adjusting a rotation speed of the rotor 101, the gap, and the like. Also, the temperature of the mixed product 50 can be regulated. The temperature of the mixed product 50 may be within a range of 50° C. or higher and 150° C. or lower. When the temperature is within such range, the coating part 12 tends to be easily formed in a way that covers the surface of the oxide part 11. Further, by adjusting the mixing ratio of the metal particle 2 to the powder of the material constituting the coating part 12, the thickness of the coating part 12 can be easily regulated.

If necessary, the soft magnetic metal powder including the soft magnetic metal particle 1 to which the coating part 12 is formed may be heat treated.

In case the oxide part 11 is formed to the metal particle 2 by a mechanochemical treatment under oxygen atmosphere, the surface roughness of the interface 2*a* between the metal particle 2 and the oxide part 11 is larger compared to that of conventional case. That is, the metal particle 2 has roughness and the oxide part 11 also has roughness. Also, a space may exist between the metal particle 2 and the oxide part 11.

When the powder form coating material is softened in this state, the softened coating material adheres to the surface of the oxide part 11. Further, when the metal particle 2 and the oxide part 11 have a space in between, the softened coating material fills the space. Then, after the metal particle 2, the oxide part 11, and the coating material are cooled to room temperature and the coating material has cured, the coating material undergoes volume shrinkage. When the metal particle 2 has roughness, the adhesiveness between the metal particle 2 and the oxide part 11, and the coating part 12 is enhanced due to this volume shrinkage.

When the dust core is produced using the soft magnetic metal powder including the soft magnetic metal particle 1 which has enhanced adhesiveness as mentioned in above, an area being weak to voltage is reduced. As a result, the withstand voltage of the dust core improves.

(5.2. Method of Producing Dust Core)

The dust core is produced using the above-mentioned soft magnetic metal powder. A method of producing the dust core is not particularly limited, and any known methods can be used. For example, first, the soft magnetic metal powder including the soft magnetic metal particles 1 and a known resin as a binder are mixed, and thereby obtains the mixed product. If necessary, the obtained mixed product can be formed into a granulated powder. Then, a mold is filled with the mixed product or the granulated powder to perform compression molding, and a molded article having a shape of dust core to be produced is obtained.

For example, by carrying out a heat treatment within a range of 50 to 200° C. to the molded article, the resin is cured, and the dust core having a desired shape is obtained in which the soft magnetic metal particles 1 are fixed via the resin. The wire is wound for a predetermined number of turns around the obtained dust core, and a magnetic component such as an inductor and the like can be obtained.

Also, a mold is filled with the above-mentioned mixed product or the granulated powder and an air coil to which a wire is wound around for a predetermined number of turns to perform compression molding, and thereby a molded article of which the coil is embedded inside may be obtained. By carrying out a heat treatment to the obtained molded article, the dust core having a desired shape in which the coil is embedded can be obtained. Such dust core has a coil embedded inside, thus it can function as a magnetic component such as an inductor and the like.

Hereinabove, the embodiments of the present invention have been described, however, the present invention is not limited to the embodiments, and it may be variously modified within the scope of the present invention.

EXAMPLE

In below, the present invention is described in further detail, however the present invention is not limited thereto.

Experiment Example 1

First, raw material metals of a soft magnetic metal powder were prepared. The prepared raw material metals were weighed so that a proportion of Fe was 95.5 mass % and a proportion of Si was 4.5 mass %, then these were placed in a crucible provided inside an atomizing device. Next, the inside of a chamber was vacuumed, and the crucible was heated by high frequency induction heating using a work coil provided to an outside of the crucible. Thereby, the raw material metals inside the crucible were melted and mixed, and obtained a molten of a temperature of 1600° C.

The obtained molten was supplied into the chamber as a continuous linear fluid through a nozzle provided at the bottom of the crucible, and gas was sprayed to the supplied molten, thereby obtained a powder. A spraying temperature of gas was 20° C.

An average particle size (D50) of the obtained powder was 20 μm. Also, an average circularity of a cross section of the particles included in the obtained powder was within a range of 0.97 to 0.98.

An X-ray diffraction measurement was carried out to the obtained powder to verify whether a crystal having a crystal particle size larger than 30 nm existed. When the crystal having the crystal particle size larger than 30 nm did not exist, then the soft magnetic metal is considered to be made of amorphous alloy. When the crystal having the crystal particle size of larger than 30 nm existed, then the soft magnetic metal was considered to be made of crystalline.

In Experiment example 1, all of the obtained powders were made of crystalline.

Next, to the obtained powder, a pre-treatment shown in Table 1 was performed. For the powders which is indicated “NONE” in the column of “pre-treatment”, this means that the pre-treatment was not performed. For the powders indicated with “heat treatment”, this means that the heat treatment was performed. For the powders indicated with “mechanochemical treatment”, this means that the mechanochemical treatment was carried out.

Conditions of the heat treatment were a heat-treating temperature at 300° C. and a heat-treating holding time for 30 minutes. The oxygen concentration in the atmosphere was 1%.

Conditions of the mechanochemical treatment (a size of the gap, an oxygen concentration in the atmosphere, and a holding time) are shown in Table 1.

When the pre-treatment was not performed, the oxide part did not form. When the pre-treatment was carried out, the thickness of the oxide part measured using a measuring method described in below is as shown in Table 1.

Next, together with the powder form coating material, the powder of each sample was placed into a container inside the powder coating device. Then, the powder form coating material was coated on the surface of the particle included in the powder, thereby the coating part was formed. The added amount of the powder form coating material was within a range of 0.01 to 3 mass % to 100 mass % of the powder which had been heat treated. Also, the coating time was within a range of 0.1 to 8 hours. A temperature of mixed product of the powder after the heat treatment and the powder form coating material was within a range of 50 to 150° C. A number ratio of the coated particles in the powder after forming the coating part was 85% to 95%. Further, a thickness of the coating part measured using the measurement method described in below was set to 25 nm.

In Experiment Example 1, phosphate-based glass of which a composition of $P_2O_5$—ZnO—$R_2O$—$Al_2O_3$ was used. As the specific composition of said phosphate-based glass, $P_2O_5$ was 50 mass %, ZnO was 12 mass %, $R_2O$ was 20 mass %, $Al_2O_3$ was 6 mass %, and rest was subcomponents.

Note that, the present inventors have also carried out similar experiments regarding cases which used glasses such as the powder form coating material of which a composition was 60 mass % of $P_2O_5$, 20 mass % of ZnO, 10 mass % of $R_2O$, 5 mass % of $Al_2O_3$, and rest was subcomponents. It was verified that the same results as described in below was obtained.

For the soft magnetic metal particle having the oxide part and the coating part, the thickness of the oxide part and the thickness of the coating part were measured as described in below. The cross section of the soft magnetic metal particle was observed using TEM. The oxide part and the coating part were identified from a contrast difference in the obtained observation image. A size of the observation image and the magnification were set to those which were sufficient to measure the thickness and the surface roughness. Further, an interface between the metal particle and the oxide part and an interface between the oxide part and the coating part were identified. In case the interface between the oxide part and the coating part was unable to identified only from the observation image, then EDS was used for identification.

Regarding the identified oxide part, thickness was measured from 10 places. The average of measured thicknesses was defined as the thickness of the oxide part. The thickness of the oxide part is shown in Table 1.

Regarding the identified coating part, thickness was measured from 10 places. The average of measured thicknesses was defined as the thickness of the coating part. As mentioned in above, the thickness of the coating part for all of the samples was 25 μm.

Further, the surface roughness of the interface between the metal particle and the oxide part was measured from the observation image. Results are shown in Table 1. Note that, for Sample No. 1 of which the oxide part was not included in the soft magnetic metal particle, the surface roughness of the interface between the metal particle and the coating part was measured. The results are shown in Table 1.

A coercivity of the soft magnetic metal powder was measured using K-HC1000 made by TOHOKU STEEL Co., Ltd as a measuring device, at a measuring magnetic field of 150 kA/m. Results are shown in Table 1.

Next, the dust core was produced. First, an epoxy resin as a heat curing resin, and an imide resin as a curing agent were weighed so that a total amount of the heat curing resin and the curing agent was 3 parts by mass with respect to 100 parts by mass of the obtained soft magnetic metal powder. The heat curing resin and the curing agent were added to acetone. The obtained solution was mixed with the soft magnetic metal powder. After mixing, acetone was evaporated and granules were obtained. The obtained granules were filtered through a mesh of 355 μm. A toroidal shaped mold having an outer diameter of 11 mm and an inner diameter of 6.5 mm was filled with the filtered granules. Next, pressure of 3.0 t/cm$^2$ was applied for pressing and the molded article of the dust core was obtained. The obtained molded article of the dust core was heat treated at 180° C. for 1 hour to cure the resin, thereby the dust core was obtained.

The withstand voltage of the obtained dust core was measured using the following method. At both ends of the sample of the obtained dust core, In—Ga electrodes were formed. Voltage was applied to both ends using a withstand voltage tester (THK-2011ADMPT made by THK CO., LTD), and the voltage when 1 mA of current flew was measured. The obtained voltage was divided by the length of the dust core, and the withstand voltage was calculated. Results are shown in Table 1.

The permeability of the obtained dust core was measured using an impedance analyzer (E4990A made by Keysight Technologies). Results are shown in Table 1. The permeability of 32.0 or more was considered good, and 35.0 or more was considered even better.

A relative withstand voltage $R_v$ was obtained as a ratio of a withstand voltage of each sample to a withstand voltage of a sample which was carried out under the same condition but without the heat treatment. A relative permeability $R_\mu$ was obtained as a ratio of a permeability of a sample to a permeability of a sample which was carried out under the same condition but without the heat treatment. Then, $R_v \times R_\mu$ was calculated. Results are shown in Table 1. When $R_v$ was 1.20 or higher, it was considered good. When $R_\mu$ was 0.90 or higher, it was considered good. When $R_v \times R_\mu$ was 1.20 or higher, it was considered good, and 1.40 or higher was considered even better.

TABLE 1

| Sample No | Example/ Comp. example | Structure | Pre-treatment | Mechanochemical treatment Gap (mm) | Oxygen concentration (%) | Time (min) | Powder Rz (nm) | Ra (nm) | Hc (Oe) | Oxide part thickness (nm) | Dust core Withstand voltage (V/mm) | Relative withstand voltage $R_V$ | Permeability | Relative permeability $R_\mu$ | $R_V \times R_\mu$ |
|---|---|---|---|---|---|---|---|---|---|---|---|---|---|---|---|
| 1 | Comparative example | crystalline | NONE | | — | | 0.7 | 0.2 | 2.8 | — | 281 | Ref | 34.3 | Ref | Ref |
| 2 | Comparative example | crystalline | Heat treated | | — | | 0.5 | 0.1 | 2.8 | 7.4 | 363 | 1.29 | 29.9 | 0.87 | 1.13 |
| 3 | Example | crystalline | Mechanochemical treated | 5 | 1 | 30 | 1.1 | 0.2 | 3.0 | 6.7 | 434 | 1.54 | 34.2 | 1.00 | 1.54 |
| 4 | Example | crystalline | Mechanochemical treated | 3 | 1 | 30 | 38.2 | 2.5 | 3.1 | 7.3 | 468 | 1.67 | 34.3 | 1.00 | 1.67 |
| 5 | Example | crystalline | Mechanochemical treated | 3 | 3 | 30 | 42.1 | 9.9 | 3.2 | 8.3 | 421 | 1.50 | 34.3 | 1.00 | 1.50 |
| 6 | Example | crystalline | Mechanochemical treated | 3 | 5 | 30 | 49.9 | 14.3 | 3.7 | 9.4 | 363 | 1.29 | 32.7 | 0.95 | 1.23 |
| 7 | Comparative example | crystalline | Mechanochemical treated | 3 | 20 | 30 | 73.2 | 22.0 | 3.7 | 13 | 283 | 1.01 | 29.8 | 0.87 | 0.87 |

According to Table 1, the soft magnetic metal powder which was carried out with a mechanochemical treatment as the pre-treatment had an increased Rz. Further, the dust core which was produced using the soft magnetic metal powder of an example having Rz within a range of 1.0 nm or larger and 50.0 nm or smaller had excellent relative withstand voltage $R_v$ and relative permeability $R_\mu$. Further, $R_v \times R_\mu$ was good.

On the contrary, the soft magnetic metal powder of the comparative example of which a heat treatment was carried out as the pre-treatment had lowered Rz and Ra compared to the soft magnetic metal powder of which the pre-treatment was not carried out. As a result, the dust core produced using the soft magnetic metal powder of which the heat treatment was carried out as the pre-treatment had a poor relative permeability $R_\mu$, and also a poor $R_v \times R_\mu$ was obtained compared to the dust core of an example.

The dust core of the comparative example having Rz being too high even though the mechanochemical treatment was carried out as the pre-treatment had poor relative withstand voltage $R_v$ and relative permeability $R_\mu$, and also a poor $R_v \times R_\mu$ was obtained compared to the dust core of an example.

Examples of which Ra were within a range of 0.2 nm or larger and 10 nm or smaller had higher withstand voltage and permeability, and excellent $R_v \times R_\mu$ compared to the example in which Ra was larger than 10 nm.

Experiment Example 2

Experiment example 2 was carried out under the same conditions as Experiment example 1 except that the prepared raw metals were weighed into 88.4 mass % of Fe, 6.5 mass % of Si, 2.6 mass % of B, and 2.5 mass % of Cr. Results are shown in Table 2. Note that, in Experiment example 2, all of the powders obtained were made of amorphous alloy.

TABLE 2

| Sample No. | Example/ Comp. example | Structure | Pre-treatment | Mechanochemical treatment Gap (mm) | Oxygen concentration (%) | Time (min) | Powder Rz (nm) | Ra (nm) | Hc (Oe) | Oxide part thickness (nm) | Dust core Withstand voltage (V/mm) | Relative withstand voltage $R_V$ | Permeability | Relative permeability $R_\mu$ | $R_V \times R_\mu$ |
|---|---|---|---|---|---|---|---|---|---|---|---|---|---|---|---|
| 8 | Comparative example | Amorphous | None | | — | | 0.8 | 0.2 | 1.2 | — | 245 | Ref | 35.8 | Ref | Ref |
| 9 | Comparative example | Amorphous | Heat treated | | — | | 0.6 | 0.2 | 1.2 | 7.3 | 323 | 1.32 | 30.5 | 0.85 | 1.12 |
| 10 | Example | Amorphous | Mechanochemical treated | 5 | 1 | 30 | 4.8 | 0.2 | 1.3 | 6.8 | 401 | 1.64 | 36.0 | 1.01 | 1.65 |
| 11 | Example | Amorphous | Mechanochemical treated | 3 | 1 | 30 | 33.0 | 2.1 | 1.3 | 7.2 | 423 | 1.73 | 35.9 | 1.00 | 1.73 |
| 12 | Example | Amorphous | Mechanochemical treated | 3 | 3 | 30 | 42.2 | 8.7 | 1.4 | 8.1 | 366 | 1.49 | 35.8 | 1.00 | 1.49 |
| 13 | Example | Amorphous | Mechanochemical treated | 3 | 5 | 30 | 47.2 | 13.2 | 1.7 | 9.3 | 321 | 1.31 | 34.1 | 0.95 | 1.25 |
| 14 | Comparative example | Amorphous | Mechanochemical treated | 3 | 20 | 30 | 60.8 | 18.0 | 1.8 | 14 | 240 | 0.98 | 30.8 | 0.86 | 0.84 |

According to Table 2, the soft magnetic metal powders which were carried out with the mechanochemical treatment as the pre-treatment had an increased Rz. Further, the dust core produced using a soft magnetic metal powder of examples having Rz within a range of 1.0 nm or larger and 50.0 nm or smaller had excellent relative withstand voltage $R_v$ and relative permeability $R_\mu$. Further, $R_v \times R_\mu$ was good.

On the contrary to this, a soft magnetic metal powder of the comparative example which was carried out with the heat treatment as the pre-treatment had lowered Rz compared to the soft magnetic metal powder of which the pre-treatment was not carried out. As a result, the dust core produced using the soft magnetic metal powder of which the heat treatment was carried out as the pre-treatment had a poor relative permeability $R_\mu$, and also a poor $R_v \times R_\mu$ was obtained compared to the dust core of examples.

The dust core of the comparative example having Rz being too high even though the mechanochemical treatment was carried out as the pre-treatment had poor relative withstand voltage $R_v$ and relative permeability $R_\mu$, and also a poor $R_v \times R_\mu$ was obtained compared to the dust core of examples.

Examples in which Ra were within a range of 0.2 nm or larger and 10 nm or smaller had higher withstand voltage and permeability, and excellent $R_v \times R_\mu$ compared to the example in which Ra was larger than 10 nm.

Experiment Example 3

Experiment example 3 was carried out the same as Experiment example 1 except that the prepared raw metals were weighed into 81.7 mass % of Fe, 7.6 mass % of Si, 2.3 mass % of B, 7.3 mass % of Nb, and 1.1 mass % of Cu; and that a heat treatment was carried at 600° C. for 1 hour before a pre-treatment. Results are shown in Table 3. Note that, in Experiment example 3, all of the obtained powders were made of nanocrystal alloys.

According to Table 3, the soft magnetic metal powders which were carried out with the mechanochemical treatment as the pre-treatment had an increased Rz. Further, the dust core produced using a soft magnetic metal powder of examples having Rz within a range of 1.0 nm or larger and 50.0 nm or smaller had excellent relative withstand voltage $R_v$ and relative permeability $R_\mu$. Further, $R_v \times R_\mu$ was good.

On the contrary to this, a soft magnetic metal powder of the comparative example which was carried out with the heat treatment as the pre-treatment had lowered Rz compared to the soft magnetic metal powder of which the pre-treatment was not carried out. As a result, the dust core produced using the soft magnetic metal powder of which the heat treatment was carried out as the pre-treatment had a poor relative permeability $R_\mu$ and also a poor $R_v \times R_\mu$ compared to the dust core of an example.

The dust core of the comparative example having Rz being high even though the mechanochemical treatment was carried out as the pre-treatment had a poor relative withstand voltage $R_v$ and also a poor $R_v \times R_\mu$ compared to the dust core of an examples.

Examples of which Ra was within a range of 0.2 nm or larger and 10 nm or smaller had higher withstand voltage and permeability, and excellent $R_v \times R_\mu$ compared to the example of which Ra was larger than 10 nm.

Experiment Example 4

Experiment example 4 was carried out under the same condition as Sample Nos. 15 and 17 except that a thickness of a coating part was varied. Results are shown in Table 4.

TABLE 3

| | | | | Mechanochemical treatment | | | Powder | | | | Dust core | | | | |
|---|---|---|---|---|---|---|---|---|---|---|---|---|---|---|---|
| Sample No. | Example/ Comp. example | Structure | Pre-treatment | Gap (mm) | Oxygen concentration (%) | Time (min) | Rz (nm) | Ra (nm) | Hc (Oe) | Oxide part thickness (nm) | Withstand voltage (V/mm) | Relative withstand voltage $R_V$ | Permeability | Relative permeability $R_\mu$ | $R_V \times R_\mu$ |
| 15 | Comparative example | Nano-crystal | NONE | | — | | 0.6 | 0.3 | 0.8 | — | 256 | Ref | 38.1 | Ref | Ref |
| 16 | Comparative example | Nano-crystal | Heat treated | | — | | 0.5 | 0.2 | 0.8 | 7.5 | 306 | 1.20 | 34.0 | 0.89 | 1.07 |
| 17 | Example | Nano-crystal | Mechanochemical treated | 5 | 1 | 30 | 8.3 | 1.2 | 0.9 | 6.9 | 389 | 1.52 | 38.1 | 1.00 | 1.52 |
| 18 | Example | Nano-crystal | Mechanochemical treated | 3 | 1 | 30 | 28.5 | 6.4 | 0.9 | 7.1 | 392 | 1.53 | 38.2 | 1.00 | 1.54 |
| 19 | Example | Nano-crystal | Mechanochemical treated | 3 | 3 | 30 | 35.5 | 8.3 | 1.0 | 8.3 | 377 | 1.47 | 38.1 | 1.00 | 1.47 |
| 20 | Example | Nano-crystal | Mechanochemical treated | 3 | 5 | 30 | 40.3 | 12.5 | 1.2 | 9.2 | 321 | 1.25 | 37.6 | 0.99 | 1.24 |
| 21 | Comparative example | Nano-crystal | Mechanochemical treated | 3 | 20 | 30 | 57.5 | 17.3 | 1.2 | 13 | 221 | 0.86 | 36.3 | 0.95 | 0.82 |

TABLE 4

| Sample No. | Example/ Comp. example | Structure | Pre-treatment | Powder Rz (nm) | Powder Ra (nm) | Powder Hc (Oe) | Powder Oxide part thickness (nm) | Powder Coating part thickness (nm) | Dust core Withstand voltage (V/mm) | Dust core Relative withstand voltage $R_V$ | Dust core Permeability | Dust core Relative permeability $R_\mu$ | Dust core $R_V \times R_\mu$ |
|---|---|---|---|---|---|---|---|---|---|---|---|---|---|
| 22 | Comparative example | Nanocrystal | NONE | 0.6 | 0.3 | 0.8 | — | 1.0 | 189 | Ref | 40.1 | Ref | Ref |
| 23 | Example | Nanocrystal | Mechanochemical treated | 8.3 | 1.2 | 0.9 | 6.9 | | 232 | 1.23 | 40.1 | 1.00 | 1.23 |
| 24 | Comparative example | Nanocrystal | NONE | 0.6 | 0.3 | 0.8 | — | 10 | 201 | Ref | 39.2 | Ref | Ref |
| 25 | Example | Nanocrystal | Mechanochemical treated | 8.3 | 1.2 | 0.9 | 6.9 | | 334 | 1.66 | 39.2 | 1.00 | 1.66 |
| 15 | Comparative example | Nanocrystal | NONE | 0.6 | 0.3 | 0.8 | — | 25 | 256 | Ref | 38.1 | Ref | Ref |
| 17 | Example | Nanocrystal | Mechanochemical treated | 8.3 | 1.2 | 0.9 | 6.9 | | 389 | 1.52 | 38.1 | 1.00 | 1.52 |
| 26 | Comparative example | Nanocrystal | NONE | 0.6 | 0.3 | 0.8 | — | 50 | 323 | Ref | 35.4 | Ref | Ref |
| 27 | Example | Nanocrystal | Mechanochemical treated | 8.3 | 1.2 | 0.9 | 6.9 | | 462 | 1.43 | 35.4 | 1.00 | 1.43 |
| 28 | Comparative example | Nanocrystal | NONE | 0.6 | 0.3 | 0.8 | — | 100 | 409 | Ref | 33.2 | Ref | Ref |
| 29 | Example | Nanocrystal | Mechanochemical treated | 8.3 | 1.2 | 0.9 | 6.9 | | 503 | 1.23 | 33.2 | 1.00 | 1.23 |

According to Table 4, it can be understood that the thicker the coating part was, the higher the withstand voltage was and the lower the permeability was. Further, for all of the examples, $R_v \times R_\mu$ was good. Particularly, when the thickness of the coating part was within a range of 10 nm or more and 50 nm or less, it was even better.

Experiment Example 5

Experiment example 5 was carried out under the same condition as Sample No. 17 except that the thickness of the oxide part was varied by changing the holding time of the mechanochemical treatment. Results are shown in Table 5.

Experiment Example 6

Experiment example 6 was carried out under the same condition as Sample Nos. 15 and 17 except that the composition of the powder form coating material was varied. Results are shown in Table 6.

In Sample Nos. 34 and 35, a glass having a composition of $Bi_2O_3$—ZnO—$B_2O_3$—$SiO_2$ was used as the powder form coating material. The specific composition of said glass was, 40 to 60 mass % of $Bi_2O_3$, 10 to 15 mass % of ZnO, 15 to 25 mass % of $B_2O_3$, and 15 to 20 mass % of $SiO_2$; and the rest was subcomponents.

TABLE 5

| Sample No. | Example/ Comp. example | Structure | Pre-treatment | Mechanochemical treatment Gap (mm) | Mechanochemical treatment Oxygen concentration (%) | Mechanochemical treatment Time (min) | Powder Rz (nm) | Powder Ra (nm) | Powder Hc (Oe) | Powder Oxide part thickness (nm) | Dust core Withstand voltage (V/mm) | Dust core Relative withstand voltage $R_V$ | Dust core Permeability | Dust core Relative permeability $R_\mu$ | Dust core $R_V \times R_\mu$ |
|---|---|---|---|---|---|---|---|---|---|---|---|---|---|---|---|
| 15 | Comparative example | Nanocrystal | NONE | | — | | 0.6 | 0.3 | 0.8 | — | 256 | Ref | 38.1 | Ref | Ref |
| 30 | Example | Nanocrystal | Mechanochemical treated | 5 | 1 | 15 | 8.2 | 1.1 | 0.8 | 1.1 | 367 | 1.43 | 38.1 | 1.00 | 1.43 |
| 17 | Example | Nanocrystal | Mechanochemical treated | 5 | 1 | 30 | 8.3 | 1.2 | 0.9 | 6.9 | 389 | 1.52 | 38.1 | 1.00 | 1.52 |
| 31 | Example | Nanocrystal | Mechanochemical treated | 5 | 1 | 60 | 8.5 | 1.4 | 0.9 | 12 | 401 | 1.57 | 37.8 | 0.99 | 1.55 |
| 32 | Example | Nanocrystal | Mechanochemical treated | 5 | 1 | 120 | 8.6 | 1.4 | 1.0 | 20 | 422 | 1.65 | 37.4 | 0.98 | 1.62 |
| 33 | Example | Nanocrystal | Mechanochemical treated | 5 | 1 | 180 | 8.4 | 1.3 | 1.1 | 26 | 432 | 1.69 | 37.1 | 0.97 | 1.64 |
| 33a | Example | Nanocrystal | Mechanochemical treated | 5 | 4 | 180 | 8.6 | 1.4 | 1.2 | 99 | 447 | 1.75 | 34.5 | 0.91 | 1.58 |

According to Table 5, it can be understood that the thicker the coating part was, the higher the withstand voltage was and the lower the permeability was. Further, for all of the examples, $R_v \times R_\mu$ was good.

In Sample Nos. 36 and 37, a glass having a composition of BaO—ZnO—$B_2O_3$—$SiO_2$—$Al_2O_3$ was used as the powder form coating material. The specific composition of said glass was, 35 to 40 mass % of BaO, 30 to 40 mass % of ZnO, 5 to 15 mass % of $B_2O_3$, 5 to 15 mass % of $SiO_2$, and 5 to 10 mass % of $Al_2O_3$; and the rest was subcomponents.

TABLE 6

| Sample No. | Example/ Comp. example | Structure | Pre-treatment | Coating material | Powder Rz (nm) | Powder Ra (nm) |
|---|---|---|---|---|---|---|
| 15 | Comparative example | Nanocrystal | NONE | $P_2O_5$—ZnO—$R_2O$—$Al_2O_3$ | 0.6 | 0.3 |
| 17 | Example | Nanocrystal | Mechanochemical treated | | 8.3 | 1.2 |
| 34 | Comparative example | Nanocrystal | NONE | $Bi_2O_3$—ZnO—$B_2O_3$—$SiO_2$ | 0.6 | 0.3 |
| 35 | Example | Nanocrystal | Mechanochemical treated | | 8.3 | 1.2 |
| 36 | Comparative example | Nanocrystal | NONE | BaO—ZnO—$B_2O_3$—$SiO_2$—$Al_2O_3$ | 0.6 | 0.3 |
| 37 | Example | Nanocrystal | Mechanochemical treated | | 8.3 | 1.2 |

| Sample No. | Powder Hc (Oe) | Powder Oxide part thickness (nm) | Dust core Withstand voltage (V/mm) | Dust core Relative withstand voltage $R_V$ | Dust core Permability | Dust core Relative permeability $R_\mu$ | Dust core $R_V \times R_\mu$ |
|---|---|---|---|---|---|---|---|
| 15 | 0.8 | — | 256 | Ref | 38.1 | Ref | — |
| 17 | 0.9 | 6.9 | 389 | 1.52 | 38.1 | 1.00 | 1.52 |
| 34 | 0.8 | — | 245 | Ref | 39.2 | Ref | — |
| 35 | 0.9 | 6.9 | 366 | 1.49 | 39.3 | 1.00 | 1.50 |
| 36 | 0.8 | — | 265 | Ref | 38.7 | Ref | — |
| 37 | 0.9 | 6.9 | 387 | 1.46 | 38.7 | 1.00 | 1.46 |

According to Table 6, the same tendencies were observed even when the composition of the coating part was varied.

NUMERICAL REFERENCES

1 . . . Soft magnetic metal particle
2 . . . Metal particle
2*a* . . . Interface
11 . . . Oxide part
12 . . . Coating part
50 . . . Mixed product
100 . . . Powder coating device
101 . . . Rotor
102 . . . Press head

What is claimed is:

1. A soft magnetic metal powder comprising a soft magnetic metal particle, wherein
   the soft magnetic metal particle includes a metal particle and an oxide part covering the metal particle,
   an interface between the metal particle and the oxide part has roughness, and
   a maximum height Rz of roughness at the interface between the metal particle and the oxide part is within a range of 1.0 nm or more and 50.0 nm or less.

2. The soft magnetic metal powder according to claim 1, wherein an arithmetic mean roughness Ra at the interface is within a range of 0.2 nm or more and 10.0 nm or less.

3. The soft magnetic metal powder according to claim 1, wherein a thickness of the oxide part is within a range of 1.0 nm or more and 100 nm or less on an average.

4. The soft magnetic metal powder according to claim 1, wherein the soft magnetic metal particle further includes a coating part covering the oxide part.

5. The soft magnetic metal powder according to claim 4, wherein a thickness of the coating part is within a range of 1.0 nm or mort and 100 nm or less on an average.

6. A dust core including the soft magnetic metal powder according to claim 1.

7. A magnetic component including the soft magnetic metal powder according to claim 1.

8. An electronic component including the soft magnetic metal powder according to claim 1.

* * * * *